United States Patent [19]

Ohkubo

[11] Patent Number: 4,623,055

[45] Date of Patent: Nov. 18, 1986

[54] HYDRAULIC CLUTCH

[75] Inventor: Masahiro Ohkubo, Kadoma, Japan

[73] Assignee: Kabushiki Kaisha Daikin Seisakusho, Neyagawa, Japan

[21] Appl. No.: 672,733

[22] Filed: Nov. 19, 1984

[30] Foreign Application Priority Data

Nov. 18, 1983 [JP] Japan .................. 58-178893[U]

[51] Int. Cl.4 .................. F16D 25/063; F16D 13/52
[52] U.S. Cl. .................. 192/85 AA; 192/52; 192/70.28; 192/89 B
[58] Field of Search ............ 192/85 A, 85 AA, 89 B, 192/70.28, 52; 188/217, 72.4, 72.6

[56] References Cited

U.S. PATENT DOCUMENTS

| | | | |
|---|---|---|---|
| 2,599,214 | 6/1952 | Wemp | 74/364 |
| 2,720,298 | 10/1955 | Youngren et al. | 192/99 |
| 2,725,964 | 12/1955 | Maurer | 192/68 |
| 3,266,608 | 8/1966 | Lemieux | 192/85 |
| 3,576,241 | 4/1971 | Maurice et al. | 192/85 |

Primary Examiner—Rodney H. Bonck
Assistant Examiner—David A. Testardi

[57] ABSTRACT

A hydraulic clutch having an annular coned disc spring interposed between a hydraulic piston and a friction material for engaging/disengaging the clutch. An inner peripheral end of the coned disc spring is supported at a position apart from a piston on a piston sliding shaft, making the coned disc spring contact with the piston at a portion between its inner peripheral end and its outer peripheral end. The sectional shape of the coned disc spring from its piston-contacting portion to the outer peripheral end is reversed from a sectional shape thereof from the inner peripheral end to the piston-contacting portion, and this piston-contacting portion moves gradually outwardly in a radial direction at a time of clutch engagement.

10 Claims, 20 Drawing Figures

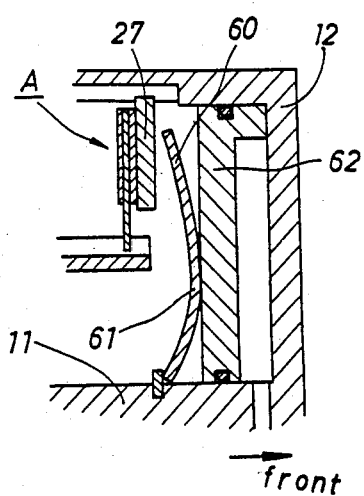
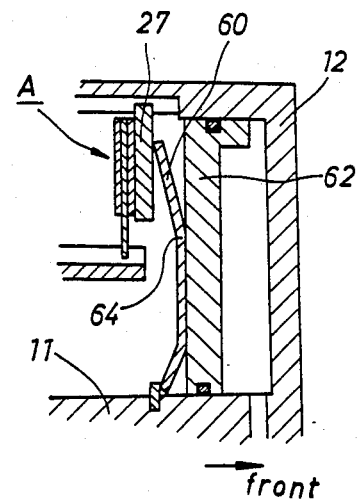
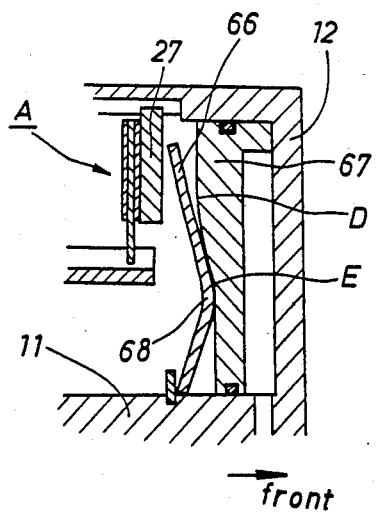

HYDRAULIC CLUTCH

BACKGROUND OF THE INVENTION

1. Field of industrial application

This invention relates, for example, to a hydraulic clutch applicable to a transmission for a construction machine, an industrial machine or a passenger car.

2. Prior Art

FIG. 1a shows a conventional hydraulic clutch which includes an output shaft 1 having a cylinder 2 formed integrally therewith. A hydraulic piston 3 is disposed in the cylinder 2, and a constant clearance l is provided between the piston 3 and a friction member 4 (shown only partly). Further, a return spring 7 (coil spring) is compressively interposed between the piston 3 and a stopper member 6 on the output shaft 1.

In such a hydraulic clutch, the constant clearance l is provided between the friction member 4 and the piston 3 in order not to transmit torque at a time of disengagement. The torque is not transmitted until the piston 3 travels through this clearance l and applies a load to the friction member 4. The time from oil pressure being sent to the piston to a load being applied to the friction material 4 is designated as "time lag". It is desired to shorten this time lag as far as possible. Further, from a standpoint of drive feeling, a characteristic by which torque is transmitted slightly at the beginning of engagement and gradually increasing thereafter is generally recognized as perferable during the period from when the friction member 4 commences transmission of torque until it completes the same.

In order to improve the time lag and the torque transmission characteristics, various means have been contrived. FIG. 1b is an example of them, in which a coned disc spring 5 for lessening a shock at a time of engagement is interposed between the piston 3 and the friction material 4. However, this construction also requires the same clearance l as the hydraulic clutch of FIG. 1a, and in order to shorten the time lag, the piston 3 must be pushed by a higher hydraulic pressure because the piston 3 has inertia. When engaging the clutch, this excessive hydraulic pressure causes a shock which worsens the torque transmission characteristics. Further, in order to gradually increase the load, contrivances such as using plural coned disc springs etc. become necessary and thus cause a cost increase. Furthermore, the above-mentioned hydraulic clutch requires the return spring 7 in addition to the coned disc spring 5, thereby including a problem of an increase in the number of components.

OBJECT OF THE INVENTION

Objects of the invention are (a) to shorten an engaging time of the hydraulic clutch, (b) to improve an effect of lessening the shock at the time of engaging the hydraulic clutch, and (c) to eliminate the independent return spring to thus decrease the number of required components.

In order to accomplish the above-mentioned objects in this invention, in a hydraulic clutch having an annular coned disc spring interposed between a hydraulic piston and a friction member for engaging/disengaging the clutch, an inner peripheral end of the coned disc spring is supported at a position apart from a piston on a piston sliding shaft, the coned disc spring is made to contact with the piston at a portion of the spring between its radially inner peripheral end and its outer peripheral end, a sectional shape of the coned disc spring from its piston-contacting portion to the radially peripheral end is formed reversely to a sectional shape thereof from the inner peripheral end to the piston-contacting portion, and the piston-contacting portion is constructed to move gradually outwardly in a radial direction at the time of engaging the clutch.

BRIEF DESCRIPTION OF THE DRAWINGS

FIG. 7 is a vertical sectional partial side view of a second embodiment.

FIG. 7a is a vertical sectional partial side view showing operation of the second embodiment.

FIG. 9 is a vertical sectional partial side view of the embodiment of FIG. 3.

DETAILED DESCRIPTION OF THE INVENTION

Figure 2:
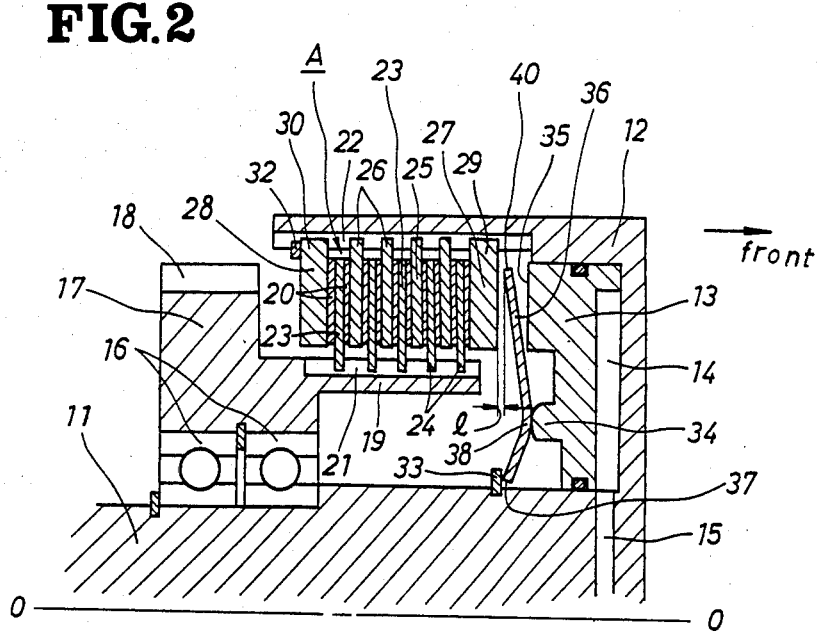
FIG. 2 is vertical sectional partial side view of a hydraulic clutch to which the present invention is applied.

FIG. 2 is a vertical sectional partial side view of the hydraulic clutch to which the present invention is applied, and in which an output shaft 11 (0—0 being its center axis) has a cylinder 12 formed integrally therewith. An annular hydraulic piston 13 fits slidably onto the output shaft 11 in the cylinder 12 to form an annular hydraulic chamber 14 between it and the cylinder 12. The hydraulic chamber 14 is connected through an oil passage 15 in the output shaft 11 and an appropriate hydraulic circuit (not shown) to a hydraulic pump. A hub 17 is fitted through a pair of bearings 16 onto the output shaft 11 so as to be relatively rotatable thereon. An input gear 18 at an outer periphery of the hub connects to a power source through another gear (not shown) meshing therewith.

A boss 19 is integrally provided on the hub 17, and an external spline 21 and an opposite internal spline 22 are formed on a boss outer periphery and a cylinder inner periphery, respectively. Plural input side annular friction plates 23 are slideably fitted onto the external spline 21 at inner peripheral projections 24 of the plates 23 and annular facings 20 are securely fixed to both front and rear faces of the friction plates 23. Output side annular friction plates 25 are disposed between the adjacent input side annular friction plates 23 respectively, and the friction plates 25 are slideably fitted into the internal spline 22 at outer peripheral projection 26 of the plates 25. The foremost friction plate 23 is opposite to a thick annular pressure plate 27, and the rearmost friction plate 23 is opposite to a thick annular back plate 28. The pressure plate 27 and the back plate 28 only slideably fit into the internal spline 22 at the outer peripheral projections 29 and 30 of the pressure plate 27 and back plate 28 respectively, and the back plate 28 contacts with a snap ring 32 (stopper member). In the illustration hydraulic clutch, a friction member A comprises the pressure plate 27, the friction plates 23 and 25, and the back plate 28 respectively.

A snap ring 33 (stopper member) is provided on an outer periphery of the output shaft. The snap ring 33 is positioned at a just inner side of the pressure plate 27. A rear outer peripheral portion of the piston 13 serves as an annular presser face 35, and only a part serving as an annular projection 34 extends rearward from a rear inner peripheral portion of the piston.

Figure 1A:
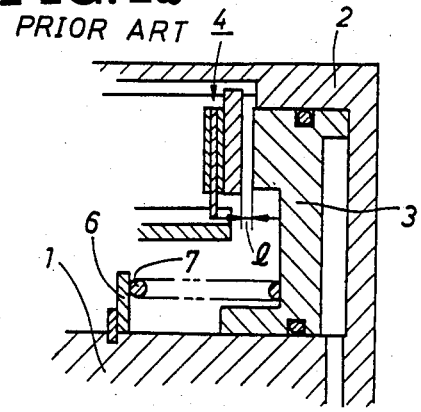
FIGS. 1a and 1b are vertical sectional partial side views of conventional embodiments.
Figure 1B:
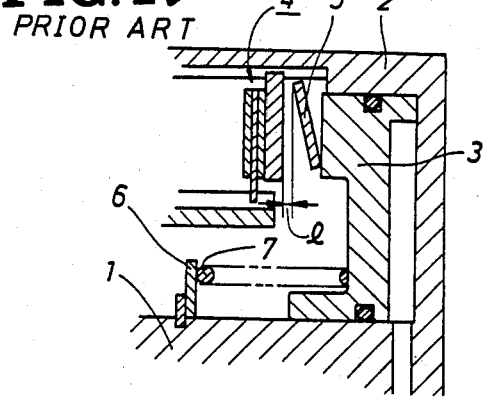
Figure 3:
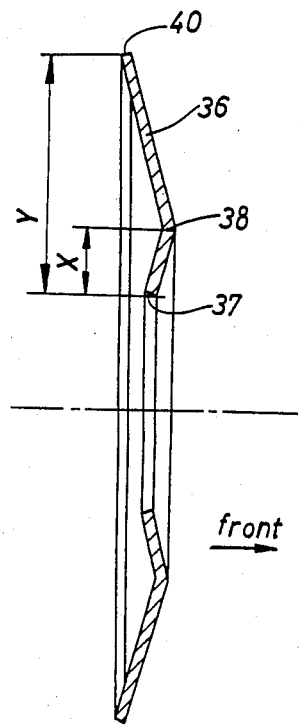
FIG. 3 is vertical sectional partial side view of a coned disc spring.
Figure 4:
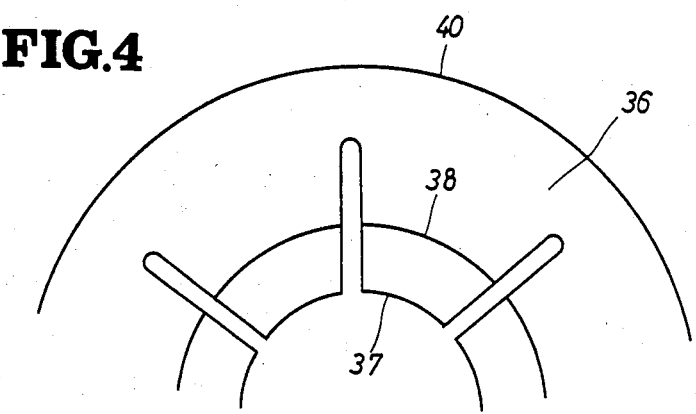
FIG. 4 is as partial elevation view of the same.

Reference numeral 36 designates a coned disc spring modified according to this invention. An inner peripheral end 37 of the disc spring 36 is stopped by the snap ring 33. In a clutch disengaged state as shown in FIG. 2, the coned disc spring 36 has a bent sectional shape such that it extends from the inner peripheral end 37 in a radial outward direction and gets near to the projection 34 to contact with the projection 34, then it gets near to the friction member A when extending further from its contact portion 38 in a radial outward direction. That is, the spring 36 has a cross-sectional shape such that the piston-contacting portion is axially closest to the piston relative to both the inner peripheral end and the outer peripheral end. The spring is interposed between the piston 13 and the friction member A under a precompressed condition. An axial clearance l is provided between an outer peripheral end 40 of the coned disc spring 36 and the friction member A. FIG. 3 is the vertical sectional side view of the coned disc spring 36 under a free state not installed in the clutch. In the figure, X shows a radial distancce between the inner peripheral end 37 of the coned disc spring and the bend or piston-contacting portion 38, and Y shows a radial distance between the inner peripheral end 37 of the coned disc spring and the outer peripheral end 40 thereof. FIG. 4 is the schematic elevation view of the coned disc spring 36.

Figure 2A:
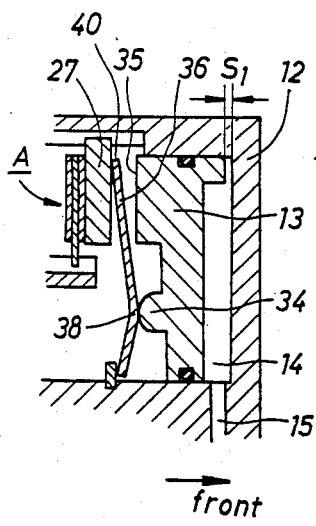
FIGS. 2a to 2c are vertical sectional partial side views showing the clutch operation.
Figure 2B:
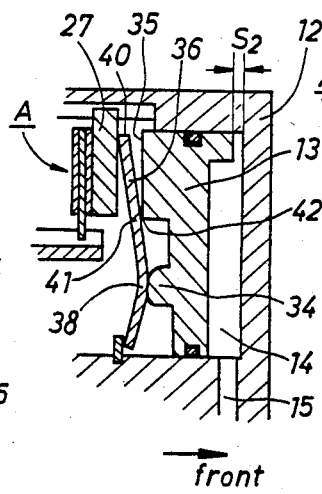
Figure 5:
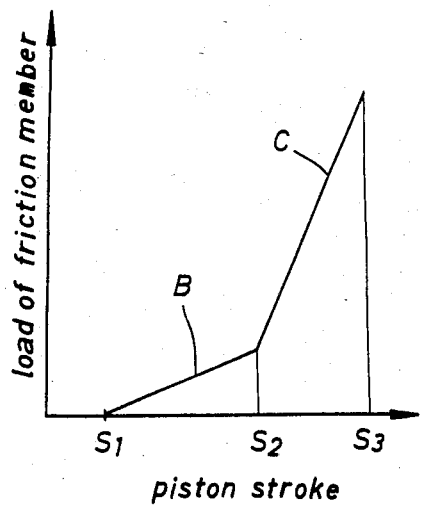
FIGS. 5 and 6 are graphs showing a relation between a piston stroke and a load applied on a friction material and a relation between the piston stroke and piston load, respectively.

When the clutch is engaged from the clutch disengaged state (FIG. 2) hydraulic pressure is supplied from said pump through the oil passage 15 etc. to the hydraulic chamber 14, thus the piston 13 is moved rearward. The load of the piston 13 is transmitted from the projection 34 to the contact portion 38 of the coned disc spring 36 in an early stage of clutch engagement. According to the present invention, in this stage the outer peripheral end 40 of the coned disc spring rearwardly traverses a distance larger by ratio Y/X of FIG. 3 than a piston stroke (rearward movement of the piston 13) on the basis of the principle of a lever. Thus, the piston-contacting portion 38 moves gradually radially outwardly with the increasing contact pressure by the piston. The outer peripheral end 40 of the coned disc spring contacts with the pressure plate 27 of the friction member A before the piston 13 has traversed the prescribed clearance l, i.e. at the time when the piston stroke reaches $S_1$ of FIG. 5 (See FIG. 2a). Thereafter, the load of the piston 13 begins to be transmitted through the coned disc spring 36 to the friction member A. In this state, a spring constant of the coned disc spring 36 is low so that the coned disc spring 36 is liable to deflect. Consequently, a load which the coned disc 36 receives from the friction member A increases at a small inclination of B in FIG. 5 with an increase in the piston stroke.

Figure 2C:
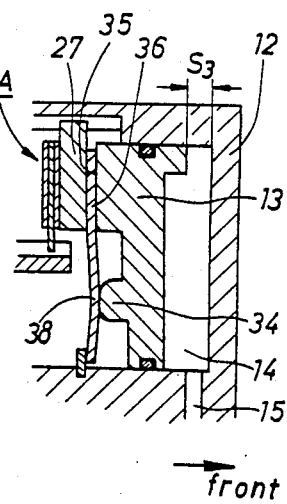

When the piston stroke reaches $S_2$, a portion 41 of the coned spring 36 contacts with the inner peripheral end 42 of the presser face 35, thus the portion 41 becomes a further piston-contacting portion. After that the load of the piston 13 is transmitted from the portion 41 to the friction member A through the outer peripheral portion of the coned spring 36. Because the apparent spring constant of the coned spring 36 increases, the load on the friction member A increases at a large inclination of C in FIG. 5. When the piston stroke reaches $S_3$, an outer peripheral part of the coned disc spring becomes flat between the presser face 35 and the pressure plate 27 as shown in FIG. 2c (completely compressed condition), thus the clutch is completely engaged. The friction member A of FIG. 2 is integrated, and the torque of the hub 17 is transmitted through the friction member A and the cylinder 12 to the output shaft 11.

Figure 6:
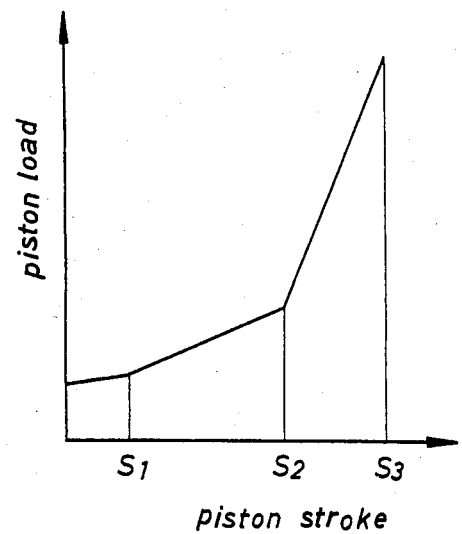

In order to disengage the clutch, it is enough to relieve the hydraulic pressure in the hydraulic chamber 14, and procedures reverse to the above-mentioned description are carried out in that case. The coned disc spring 36 serves as a return spring in this instance. Incidentially, FIG. 6 shows a relation between the piston stroke and the load (piston load) which is applied to the coned disc spring 36 from the piston.

Figure 8:
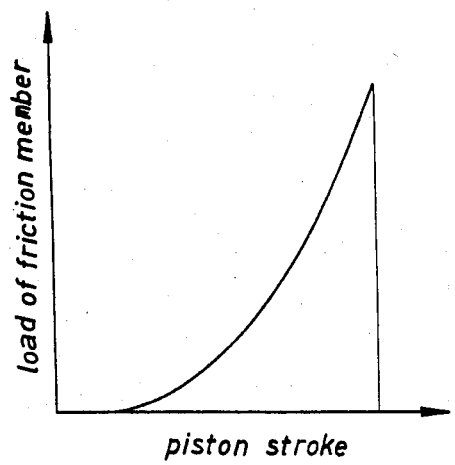
FIG. 8 is a graph corresponding to the embodiment of FIG. 5.

FIG. 7 shows another embodiment. In this case, a coned disc spring 60 has a curved sectional shape and contacts with a piston 62 at a portion 61 slightly near to an inner periphery thereof. A rear surface of the piston 62 is flat. The load of the piston 62 is received by the contact portion 61 of the coned disc spring 60 at the beginning of clutch engagement, however, as seen from FIG. 7a, a contact portion 64 i.e. a piston-load-receiving-portion of the coned disc spring 60 moves continuously outwradly in a radial direction with a progressing of engagement. (Acutally, the load is received by the entire contact portion of the coned disc spring 60 against the piston 62, but it will be better to consider this function as mentioned above for convenience.) In this instance, an apparent spring constant of the coned disc spring 60 will increase continuously, and the relation between the the piston stroke and the load received by the friction member A will become a curve as shown in FIG. 8.

Further, in FIG. 9, when a piston 67 is formed with a curved sectional shape between D and E as shown in the figure, even in case of using a bent coned disc spring 66, a contact portion (68 in the beginning stage) of the coned disc spring 66 moves continuously outwardly in the radial direction.

Figure 10A:
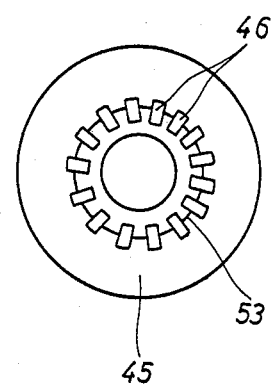
FIGS. 10a to 10c are schematic contracted elevation views showing embodiments of modified coned disc spring.
Figure 10B:
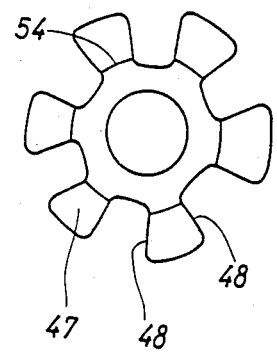
Figure 10C:
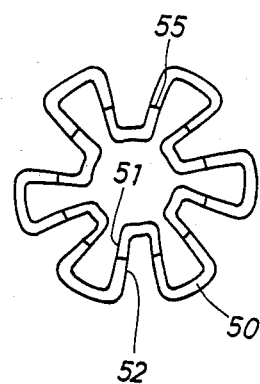

In embodying the present invention, the coned disc spring may be formed into shapes as shown in FIGS. 10a to 10c. Namely, a coned disc spring 45 of FIG. 10a has a plurality of square holes 46 (for avoiding concentrated stress), and a coned disc spring 47 of FIG. 10b has a plurality of radial wide slits 48 at its outer periphery. Further, a coned disc spring 50 of FIG. 10c is provided with radial slits 51 and 52 from inner and outer peripheral sides alternatively. Curves 53, 54 and 55 on each of respective coned disc springs 45, 47 and 50 are the contact portions with the hydraulic piston at the time of clutch disengagement.

Figure 11A:
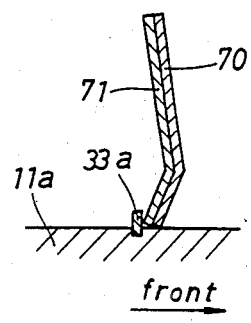
FIGS. 11a to 11c are vertical sectional partial side views showing other embodiments of modified coned disc springs.
Figure 11B:
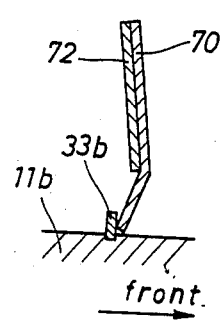
Figure 11C:
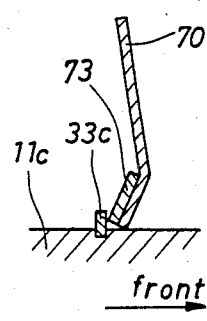

Moreover, in embodying the present invention, load characteristics received by the friction member A may be changed variously by using a combination of plural disc springs such as first and second coned springs 70 and 71 shown in FIG. 11 or by reinforcing only an inner peripheral part or an outer peripheral part of the coned disc spring 70 with another disc spring 72 or 73 as shown in FIGS. 11b and 11c. Furthermore, the input and output sides of the hydraulic clutches such as shown in FIG. 2 etc. may be reversed. In such a case, 11 will indicate the input shaft and 18 will indicate the output shaft. Incidentially, the present invention may be applicable to a hydraulic clutch of a type other than described above, such as that in which a clutch cover connected to an input shaft (or an output shaft) is disposed oppositely to a hub connected to an output shaft (or an input shaft) and a friction member us interposed therebetween.

EFFECT ON THE INVENTION

The following effects are obtainable according ro this invention: (a) The time lag of the hydraulic clutch can be shortened. That is, at the time of clutch engagement, the outer peripheral end of the coned disc spring travels a distance several times (for example, a ratio of Y/X of FIG. 3) longer than the piston stroke toward the friction member side, so the outer peripheral end of the coned disc spring contacts with the friction member rapidly. (b) The shock at the time of clutch engagement can be lessened. That is, at the beginning of clutch engagement, the spring constant of the coned disc spring is low and the apparent spring constant increases stepwise of in a stepless manner with a progressing of engagement, so that an increasing rate of the load received by the friction material increases stepwise or in a stepless manner. (c) An independent return spring becomes unneccessary and the number of required components is lessened.

What is claimed is:
1. A hydraulic clutch comprising
an input member,
an output member rotatable coaxially with said input member,
friction means provided between said input and output members for selectively engaging and disengaging said members from each other,
an annular hydraulic piston slidably mounted on one of said members for selectively actuating said friction means, and having an axially directed back face and
an annular coned disc spring interposed between said piston and said friction means, said spring having a radially inner peripheral end, a radially outer peripheral end, and a piston-contacting portion radially intermediate said inner and outer peripheral ends, said inner peripheral end being supported on the piston-mounting member at a position apart from said piston, said spring having a cross-sectional shape such that said piston contacting portion is axially closest to said back face of said piston relative to both said inner peripheral end and said outer peripheral end, said piston-contacting portion moving gradually radially outwardly with increasing contact pressure by said piston.

2. A hydraulic clutch as set forth in claim 1, wherein said back face of said piston has an axially extending annular pressure face with a radially inner edge and an axially extending annular projection contacting said piston-contacting portion and positioned radially inwardly of said inner edge, and said disc spring includes a further piston-contacting portion which is contacted by said inner edge of said pressure face as said piston moves axially towards said friction means.

3. A hydraulic clutch as set forth in claim 1, wherein said cross-sectional shape of said disc spring is a continuous curve.

4. A hydraulic clutch as set forth in claim 1, wherein said cross-sectional shape of said disc spring is a bent shape, said piston-contacting portion being defined by a bend portion, and said back face of said piston has a radially curved surface which is positioned radially more outwardly than said bend portion of said spring.

5. A hydraulic clutch as set forth in any one of claims 1 to 4, wherein a plurality of square holes are formed in said disc spring for avoiding concentrated stress.

6. A hydraulic clutch as set forth in any one of claims 1 to 4, wherein a plurality of radially extending wide slits are provided along said outer peripheral end of said disc spring.

7. A hydraulic clutch as set forth in any one of claims 1 to 4, wherein plural radial slits are provided in said disc spring alternately from said inner and outer peripheral ends.

8. A hydraulic clutch as set forth in any one of claims 1 to 4, further comprising another annular disc spring layered with said annular coned disc spring.

9. A hydraulic clutch as set forth in claim 8, wherein said another disc spring extends radially from said outer peripheral end of said coned disc spring to a position radially outwardly of said piston-contacting portion of said coned disc spring.

10. A hydraulic clutch as set forth in claim 8 wherein said another disc spring extends radially from said inner peripheral end of said coned disc spring to a position radially inwardly of said piston-contacting portion of said coned disc spring.

* * * * *